Sept. 19, 1939.   C. C. TAYLOR   2,173,771
GROUND PREPARING MACHINE
Filed March 28, 1938   2 Sheets-Sheet 2
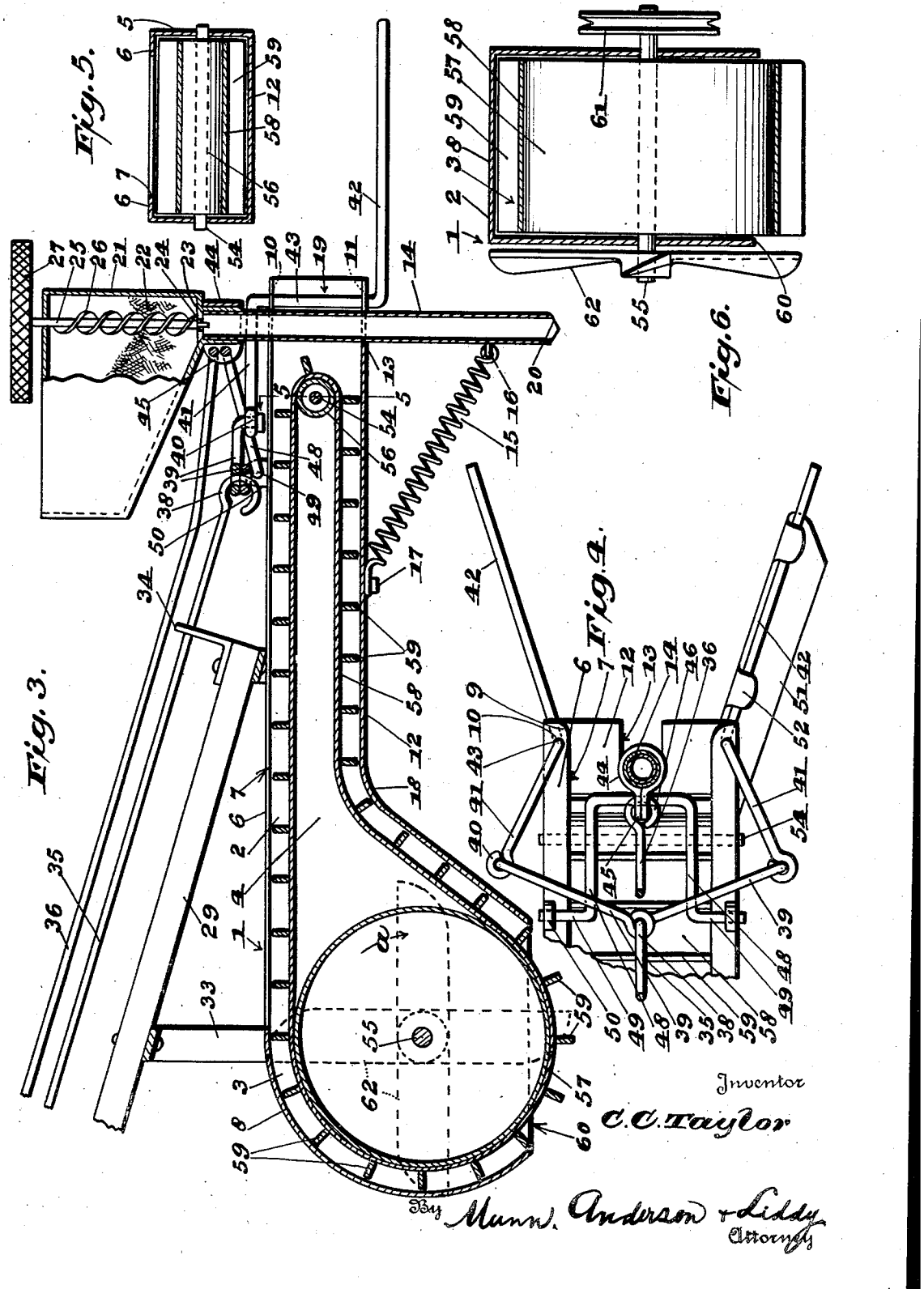
Inventor
C. C. Taylor
By Munn, Anderson & Liddy
Attorneys Patented Sept. 19, 1939

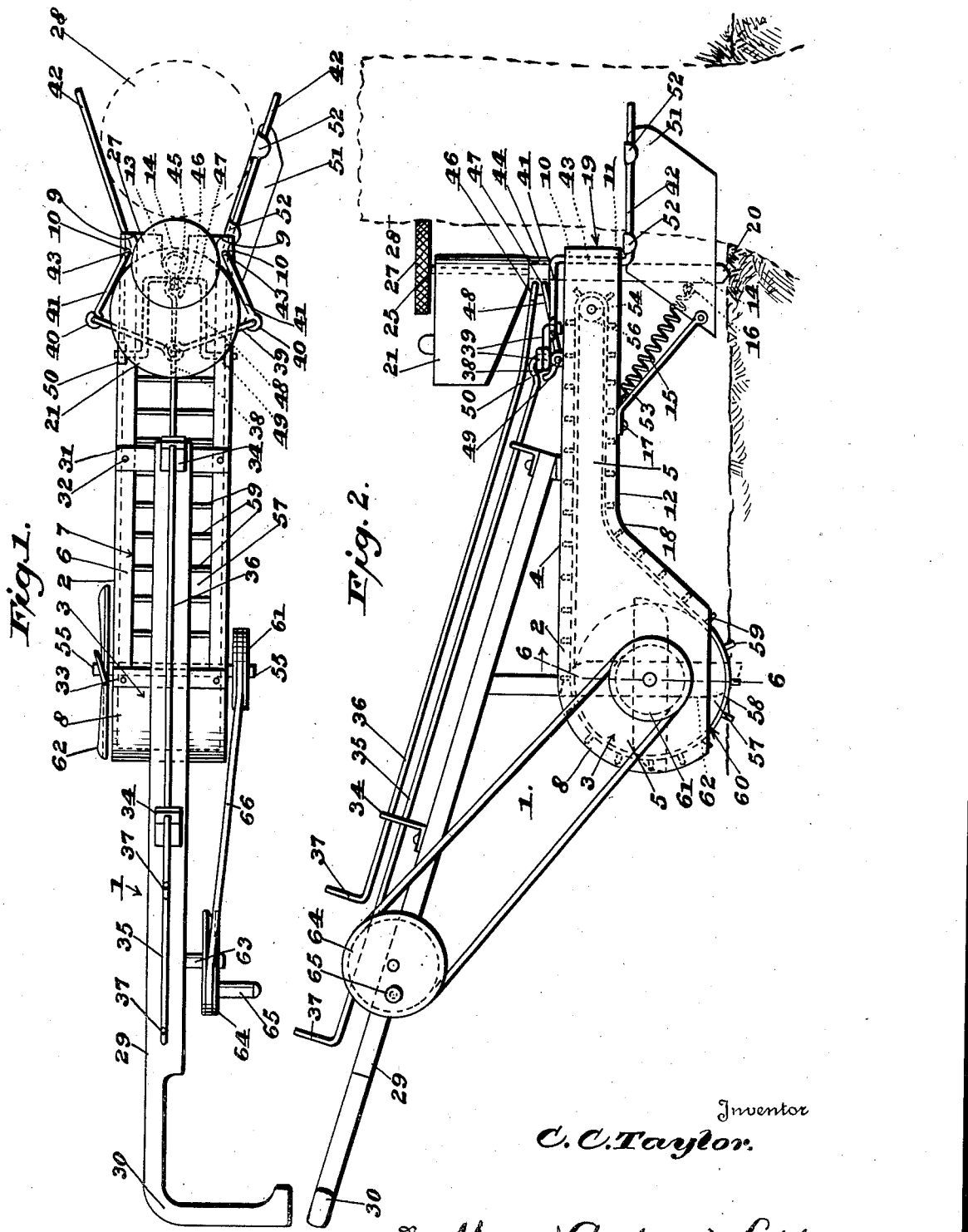

2,173,771

UNITED STATES PATENT OFFICE 2,173,771

GROUND PREPARING MACHINE

Clarence C. Taylor, Mounds, Ill.

Application March 28, 1938, Serial No. 198,520

18 Claims. (Cl. 47—57)

This invention relates to improvements in agricultural implements, more especially to a machine for preparing the ground around fruit trees during the application of a poison to the ground. The particular type of tree which the instant machine was contrived to treat is the peach. In some sections of the country this fruit tree suffers the periodic ravages of the peach-borer.

It has been found that an insecticide known as paradichlorobenzene salts is most effective in combating this insect, but inasmuch as an undesirably high percentage of the gas, arising from the vaporization of the salts, blows away before the workman is able to cover the salts with earth the care and cultivation of the peach tree has presented such a problem that the insecticide could not always be used to the best effect.

According to the instant invention the ground around the peach tree is impregnated with the poison with a modified drilling action, that is to say, the powder is deposited much on the order as seeds are deposited by a drill, the treatment being completed by scratching the earth and throwing it toward the base of the trunk so as to cover the powder. With this preamble in mind, the objects of the invention are as follows:

First, to provide a machine for preparing the ground especially at the base of a standing tree so as to retain an insect-destroying poison which is deposited simultaneously with the preparing operation which includes covering the poison.

Second, to provide a machine for depositing a poison around the base of a standing tree, at the same time digging up earth, dumping it at the base of the tree and over the poison, and smoothing off the surface of the loose earth to give the treated place a uniform appearance.

Third, to provide a machine for treating the ground around an embedded mount with an insecticide, the mount serving as a base around which the machine is traversed in the accomplishment of simultaneous drilling, digging and covering operations.

Other objects and advantages will appear in the following specification, reference being had to the accompanying drawings, in which:

Figure 1 is a plan view of the ground preparing machine,

Figure 2 is a side elevation thereof,

Figure 3 is an enlarged sectional view, parts being shown in elevation,

Figure 4 is a detail plan view of the centering mechanism,

Figure 5 is a cross section taken on the line 5—5 of Fig. 3, and

Figure 6 is a cross section taken on the line 6—6 of Fig. 2.

The machine, generally designated 1 in Fig. 1, is of such a size that it can readily be handled and operated by one man. In this respect it approximates the general proportions of an ordinary walking cultivator. It consists of a box 2 which has a drum 3 at one end that merges into a tunnel 4. The sides 5 are bent over at the top to provide ledges 6 (Fig. 1). These are rather narrow, and because of their narrowness they define the sides of a longitudinal top opening 7.

This opening is ended at the rear by the curved cover portion 8 of the drum 3 (Fig. 1). The forward ends of the ledges are rounded off at 9, and adjacent to them there are holes 10 which register with corresponding holes 11 in the bottom 12 of the box. Said bottom is centrally notched at 13 (Fig. 3) to accommodate the drill tube 14. The back of the notch provides a stop for the drill tube, holding the latter in the upright position shown.

A spring 15 tends to keep the drill tube in the upright position mentioned. Its ends are anchored to an eye 16 on the drill tube and to a bolt 17, or its equivalent, beneath the bottom 12. The latter is curved at 18 (Fig. 3), it being noted that the tunnel 4 is of much less height than the drum 3. The forward end of the tunnel 4 is open at 19 for the discharge of earth onto the insecticide which is deposited by the drill tube 14.

The latter is pointed at 20 (Fig. 3). The purpose of the point is to score the earth. The insecticide is deposited in the furrow produced by scoring. Inasmuch as the tube is held in the notch 13 it follows that the tube will be adequately braced in the lateral direction, as is necessary because of the horizontal turns which the machine is given in doing scoring.

A hopper 21 (Fig. 3) surmounts the drill tube 14. The insecticide 22 is loaded into the hopper through an appropriate opening. As already mentioned, this insecticide consists of paradichlorobenzene salts, but in practice it may comprise any desired insecticide whatsoever, this depending upon the nature of the use to which the machine is to be put.

At the throat 23 where the drill tube 14 joins the hopper 21 there is a spider 24 which provides a journal for the lower end of the shaft 25 of an auger 16. The turning of this auger forces the insecticide 22 through the throat, the drill tube then directing it into the furrow made by the point 20.

A wheel 27 is the means for turning the auger shaft 25. This wheel may be turned in any one of several known ways, but the way herein contemplated is to abut the wheel against the trunk of the tree 28, and then in slowly turning the machine around the tree with the tree as a center the frictional contact between the wheel and the tree trunk will cause the turning of the auger shaft. For this purpose the periphery of the wheel 27 is desirably roughened as shown.

A bar 29 provides the means for manipulating the machine. This bar has a handle 30 at one end, providing for an adequate grasp by the workman. The other end of the handle bar is secured to a brace 31 which bridges the opening 7 (Fig. 1) and in turn has its ends secured at 32 to the ledges 6. A somewhat similar brace 33 is connected between the handle bar and the box 2 at another point (Fig. 3), making the handle perfectly rigid.

Upstanding brackets 34 provide guides for a pair of rods 35, 36. Each of the rods has a handle 37 at its upper end (Fig. 2), and the handles are spaced apart so as to provide enough room for independent operation. The uppermost bracket 34 carries the rod 35 only. There are holes in this bracket for the rods and the holes are sufficiently oversize to provide enough play for the rods so that they will not bind when operated.

A large eye 38 at the lower end of the rod 35 provides the common connection for a pair of links 39 (Fig. 1). The outer ends of the links 39 are connected at 40 to the arms 41 of a pair of guides 42. These guides stand in diverging relation to the front end of the machine. They are somewhat like a fork, and their purpose is to engage the sides of the tree or mount 28, making the latter serve as an axis about which the machine is turned.

These guides are parts of upright shafts 43 which are journaled in the registering holes 10, 11. By moving the rod 35 forward and backward the links 39 either cause the arms 41 to spread apart or move together closer, with the result that the guides 42 are either closed or opened. In this way the guides are accommodated to various sizes of trees, and this same adjustment enables spacing the drill tube 14 closer to or farther from the tree trunk. For example, if a given tree should have protruding roots near its base it would be desirable to space the drill tube farther from the tree than if the ground surface were unobstructed.

A collar 44 (Figs. 2 and 3) is secured to the drill tube 14. It is provided with at least one ear 45 which is large enough to enable the attachment of the eye 46 on the lower end of the rod 36, and also of the bight 47 of a yoke 48. The trunnion ends 49 of this yoke have bearings in brackets 50 which are affixed to the box 2.

The yoke 48 is, in effect, a link connection between the box 2 and the drill tube 14. A pull on the rod 36 will swing the tube 14 in a generally counterclockwise direction, the yoke 48 constituting its pivot, thereby raising the point 20 from the ground and displacing the wheel 27 from the side of the tree. This action is against the tension of the spring 15, and when the rod 36 is released the drill tube assemblage is automatically returned.

One of the guides 42 is used as the support from which a plate 51 is made to depend. This plate comprises a sweep, and its purpose is to smooth and level the earth which is dumped at the base of the tree. It is secured to the respective guide by any suitable means 52, and braced to the box by a rod 53 (Fig. 2).

With respect to scratching the ground and dumping the diggings at the base of the tree reference is made to Fig. 3 wherein the box 2 is seen to carry shafts 54, 55 near the end of the tunnel 4 and in the drum 3. The respective shafts have pulleys 56, 57 over which a belt 58 is trained. This belt carries lugs 59. The bottom of the drum 3 is open at 60 (Fig. 3). Since a portion of the cylinder 59 projects through this opening, it follows that the lugs 59 are carried in earth-engaging positions, enabling a scratching of the surface and conveyance of the diggings up into the box 2, whence they are carried forwardly and discharged at the opening 19.

Toward these ends the belt 58 and its lugs 59 comprise both an earth-loosening and conveyor element. The direction of rotation of the pulley 57 is clockwise (arrow a, Fig. 3). The earth is thus carried upwardly in back of the curved cover 8 and along the top strand of the conveyor where it is visible through the opening 7 (Fig. 1). The edges of the lugs 59 merely scrape along the bottom 12 of the box on the return side of the conveyor.

A V-pulley 61 (Fig. 2) is secured to one of the extended ends of the shaft 55. A sod cutter 62 (Fig. 1) is secured to the other extended end. A support 63 (Fig. 1), on the side of the handle bar 29 carries a V-pulley 64. This pulley is in the nature of a crank inasmuch as it has a handle 65 for turning. A belt 66 connects the pulleys 61, 64, and when the pulley 64 is turned clockwise the conveyor assemblage (Fig. 3) is driven accordingly for the purpose already named.

The operation is readily understood. The operator either rolls or carries the machine to the tree 28 which needs a treatment. The guides 42 are adjusted by manipulating the rod 35, both for the size of the tree and the spacing of the drill tube assemblage from the tree.

The point 20 of the drill tube is dropped into engagement with the ground. The wheel 27 is brought into engagement with the tree. The pulley 64 is turned in the clockwise direction, and as the earth is scraped up by the lugs 59 the operator will be able to gradually work his way around the tree in the clockwise direction (looking down from above) using the tree as an axis upon which to swing the machine.

The amount of earth to be dug up can be regulated by the way in which the machine is supported at the handle 30. If the operator bears upwardly the amount of scratching will be correspondingly light. If he bears down he will be able to dig up more earth. In any event the diggings are conveyed along the tunnel 4 and discharged at the opening 19 to the base of the tree.

In the meantime the point 20 of the tube 14 will score the earth. The turning of the auger 26 will work out some of the insecticide 22, and this being directed along the tube 14 will be deposited in the furrow. The earth discharged at 19 will cover the furrow, and there will be no chance whatsoever of the insecticide vaporizing and blowing away.

If the operator finds that he is piling up too much earth he may lift the handle 30 so as to disengage the lugs 59 from the ground, whereupon continued walking around will cause the sweep 51 to smooth and pack the pile. When it is desired to put the finishing touches on the dumped earth the operator will pull on the rod 36 and thus raise the tube 14 from the ground and displace the wheel 27 from the tree. The sweep 51 will then smooth the earth without the possibility of the point 20 tearing down the mound.

Even though the tree 28 may be poorly shaped, the wheel 27 will maintain its engagement because of the tension of the spring 15. This spring tends to hold the tube 14 upright, and in doing so keeps the wheel 27 in its farthest forward position.

I claim:

1. A manually wieldable machine having a handle on one end, a drill tube on the other end of the machine for scoring the ground as the machine is moved by the wielding of the handle, means responsive to the movement of the machine for depositing a fugitive substance through the drill tube into the furrow resulting from the scoring, and means mounted on the machine, being manually operable independently of the movement of the machine for scratching the ground at a distance from the drill tube and depositing the scratchings in the furrow to cover the deposited substance.

2. A drill tube for scoring the ground and depositing a substance directed therethrough into the furrow resulting from the scoring, means to engage a mount fixed in the ground in such manner as to space the drill tube therefrom and keep the furrow at a determined distance from said mount, and a handle which is wielded by an operator to make the drill tube do the scoring while said means is held against the mount.

3. A drill tube for scoring the ground and depositing a substance directed therethrough into the furrow resulting from the scoring, means to so engage a mount fixed in the ground as to space the drill tube therefrom and keep the furrow at a determined distance from said mount, an adjustment for so regulating said means as to vary the spacing of the drill tube and furrow from the mount, and a handle which is wielded by an operator to make the drill tube do the scoring while said means is held against the mount, using the mount as a center.

4. A drill tube for depositing a substance directly therethrough, guide means to so engage a mount fixed in the ground as to space the drill tube therefrom, means for adjusting the guide means so as to both fit the mount and to space the drill tube the required distance from the mount, and a handle which is wielded by an operator to hold the guide means against the mount while moving the drill tube in a curved path to score the ground and produce a circular furrow.

5. A drill tube for depositing a substance directed therethrough, a hopper for said substance having means to cause the substance to go into the drill tube and a wheel to work said means, guide means to so engage a mount fixed in the ground as to space the drill tube therefrom at the same time adapting the wheel to the mount, and a handle which is wielded by an operator to hold the guide means and wheel against the mount while moving the drill tube in a curved path thereby to score the ground and deposit its carried substance into the furrow.

6. A drill tube for depositing a substance directed therethrough, a hopper for said substance having means to cause the substance to go into the drill tube and a wheel to work said means, guide means to so engage a mount fixed in the ground as to space the drill tube therefrom at the same time adapting the wheel to the mount, a handle which is wielded by an operator to hold the guide means and wheel against the mount while moving the drill tube in a curved path thereby to score the ground and deposit its carried substance into the furrow, and means to which the handle is connected and by which the drill tube is carried, through which to dump earth adjacent to the drill tube and onto the substance deposited thereby.

7. A box having two openings, a drill tube carried by the box adjacent to one opening, an insecticide hopper on the tube, guide means which is engaged with a mount fixed in the ground by pushing on the box, thereby to space the drill tube from the mount, insecticide-discharging means in the hopper, an element which is part of the discharging means, also being engaged with the mount, earth scratching and conveying means in the box, being exposed at the other opening and having its delivery at the first opening, and means with which to operate the last means while walking the box around the mount in a circle.

8. A box, a combined digger and conveyor, being operable to dig earth at one end of the box, convey it through the box and discharge it at the other end of the box, guide means which is held against a fixed mount by pushing on the box, said box being raised and lowered with the guide means as a pivot to vary the amount of digging, a drill tube through which to discharge a substance, the point of the drill tube scoring the earth while walking the box around the mount, and means to feed the substance into the drill tube, being actuated by contact with the mount and the motion of the box around the mount.

9. A drill tube for scoring the ground and depositing a substance directed therethrough into the furrow resulting from the scoring, means for continuously scratching the ground, elevating the diggings and discharging them into the furrow and onto the deposited substance, and means for smoothing off the discharged diggings simultaneously with said scoring and depositing.

10. A drill tube for scoring the ground and depositing a substance directed therethrough into the furrow resulting from the scoring, means for continuously scratching the ground, elevating the diggings and discharging them into the furrow and onto the deposited substance, means for smoothing off the discharged diggings simultaneously with said scoring and depositing, and means with which to displace the drill tube from its scoring and depositing position thereby to avoid disrupting the smoothed diggings.

11. A drill tube for scoring the ground and depositing a substance directed therethrough into the furrow resulting from the scoring, means for continuously scratching the ground, elevating the diggings and discharging them into the furrow and onto the deposited substance, means for smoothing off the discharged diggings simultaneously with said scoring and depositing, and means with which to raise the drill tube from the ground and above the smooth mound of diggings.

12. In a ground working machine, an earth conveyor tunnel having a discharging opening, a drill tube upright across the opening and being adapted to deposit a substance directed therethrough, guide means on the tunnel adjacent to its opening, engageable with a fixed mount by pushing the tunnel so as to dispose the drill tube in a ground-engaging position, and means by which to raise and lower the tube with respect to the tunnel so as to vary the depth of the furrow made by the tube when the tunnel is walked around the mount.

13. In a ground-working machine, an earth conveyor tunnel having a discharge opening, a drill tube adapted to deposit a substance directed therethrough, a linkage hingedly connecting the tube to the tunnel in an upright position across the opening, and means by which to lift the tube and turn the linkage, thereby displacing the tube with respect to the opening.

14. In a ground-working machine, an earth conveyor tunnel having a discharge opening and a notch, a drill tube adapted to deposit a substance directed therethrough, a linkage hingedly connecting the tube to the tunnel, means also connected to the tube, aiding in its support and being adapted to lift the tube and turn the linkage, and a spring connected between the tube and tunnel normally holding the tube in position in the notch by yielding to the lifting of said means.

15. In a ground-working machine, an earth conveyor tunnel having a discharging opening, a drill tube supported in an upright position across the opening and adapted to deposit a substance directed therethrough, a pair of guides, and means by which they are swingably connected to the tunnel at the sides of the tube, and a linkage connected to portions of the guides being operable to swing the guides to fit a tree and thereby space the tube from the tree.

16. In a ground-working machine, an earth conveyor tunnel having a discharge opening, a drill tube adapted to deposit a substance directed therethrough and beneath the earth discharged from said opening, a pair of guides to engage a tree and spacing the tube from the tree, said guides utilizing said tree as an axis upon which the tunnel is horizontally turnable to cause the drill tube to score the ground, a sweep plate to smooth the mound produced by discharging the earth, and means by which to connect the sweep plate to one of the guides.

17. In a ground-working machine, a box comprising a drum with an opening and a connected tunnel also with an opening, conveyor means situated in the box, being exposed at the drum opening to dig up the earth and convey it through the tunnel and its opening, a sod cutter working in conjunction with the exposed part of the conveyor means to loosen the earth in advance of said conveyor means, means with which to space the box from a tree and to utilize said tree as an axis upon which the box can be swung, and means to simultaneously score a furrow close to the tree and deposit an insecticide beneath the earth discharged at said conveyor opening.

18. A ground working machine, comprising a box with a handle, means at one end of the box to be pushed against a tree while walking the box around the tree, earth cutting means carried by the box and exposed at one portion thereof, means carried by the handle and connected to said means causing it to operate to cut the earth, convey it through the box and discharge it at the base of the tree, and means situated at the discharge end of the box for scoring the ground and simultaneously depositing an insecticide beneath the discharged earth.

CLARENCE C. TAYLOR.